Oct. 6, 1925.
J. P. BALL
1,556,061
SAWING MACHINE
Filed Dec. 18, 1922
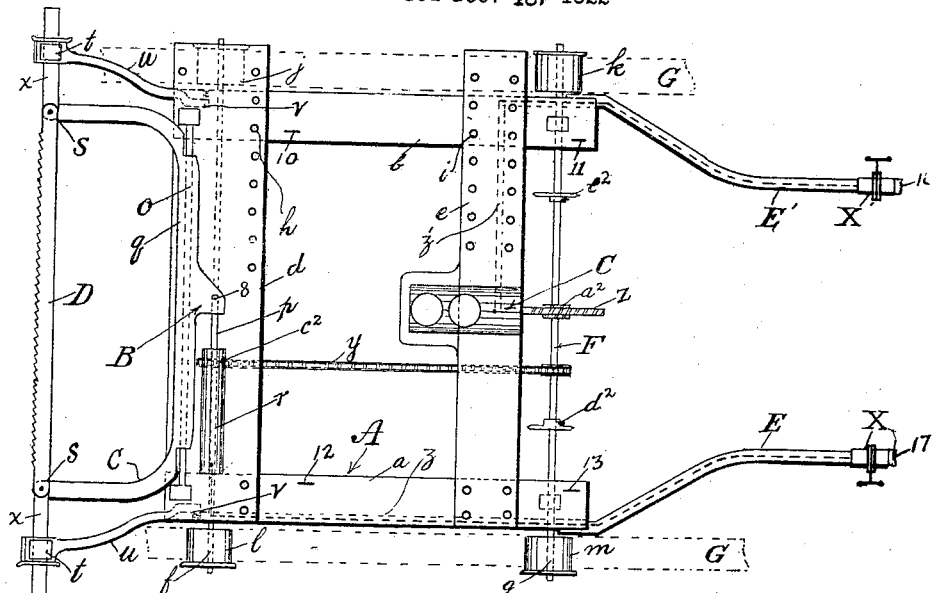
Figure 1,
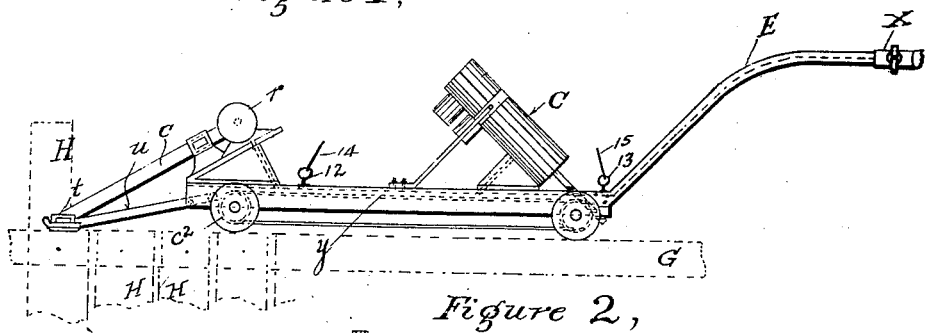
Figure 2,
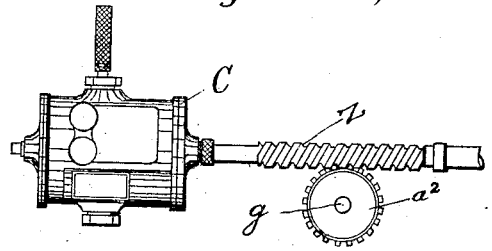
Figure 3,
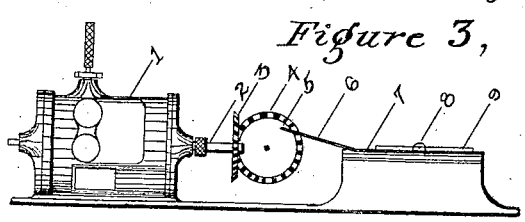
Figure 4,
Inventor,
John P. Ball, Patented Oct. 6, 1925.

1,556,061

UNITED STATES PATENT OFFICE.

JOHN P. BALL, OF CHICAGO, ILLINOIS.

SAWING MACHINE.

Application filed December 18, 1922. Serial No. 607,665.

*To all whom it may concern:*

Be it known that I, JOHN P. BALL, a citizen of the United States, and a resident of Chicago, in the county of Cook and State of Illinois, have invented certain new and useful Improvements in Sawing Machines, of which the following is a specification.

This invention relates to a machine more especially adapted for submarine operations as for example sawing off driven piles and the like, under water and consists preferably of a straight blade cross-cut saw adapted to be driven by pneumatically operated mechanism and mounted on a carriage which may be moved forward or backward by suitable power mechanism so as to adjust the saw to the desired bearing: the forward and backward motion of the carriage being controlled preferably by an auxiliary pneumatically operated compound motor adapted to control a suitable transmission in conjunction with a system of circular creepers.

In order to operate a device of this kind, it is necessary to provide suitable tracks upon which the combined machine may travel, and these bearing tracks should be substantially in the same plane as the required cutting of the saw. It is therefore an object of my invention to provide temporary tracks or fixed members to support the machine in cases where a permanent track is not already designed or constructed. In order to provide a temporary support or platform upon which the machine may run, horizontal wale strips may be spiked to the timber-to-be-sawed at the desired elevation of the cutting.

While my invention is especially adapted to the sawing of timber, it may be employed for the sawing of metal or stone as well which may be located either below or above the surface of the water.

One object of my invention is to provide separately controlled pneumatically operated means for operating the saw and for advancing the carriage with the saw toward the material to be cut.

Another object of my invention is to provide means whereby the submerged carriage with the saw may be guided in its course and operation of the pneumatic mechanism controlled from a plane above that of the carriage; the latter being also provided with sufficient means, as for example bolts, which enable the carriage to be supported by cables and suspended from a scow thereby permitting the machine to be operated and controlled by a submerged operator or diver.

Figure 1 is a plan view of the preferred form of my apparatus.

Figure 2 is a side elevation.

Figure 3 is a detail elevation of the carriage driving mechanism.

Figure 4 is a detail elevation of modified form of saw operating mechanism.

Referring to the drawings, A in a general way indicates a carriage or truck; B in a general way, the sawing mechanism; C the power imparting mechanism for feeding or driving the carriage or truck; D a cross-cut saw or blade; E and E' the control members or handles; F the main driving axle of the carriage, G is the platform or supports and H is the pile or material to be sawed.

These may be of any usual or suitable constructions and arrangement capable of carrying the assembled members and driving the sawing mechanism, moving the carriage into desired place or position and controlling the motion of the machine.

The carriage A is preferably built comparatively low, with its frame in the particular exemplification being constructed preferably of two longitudinal channel beams, $a$ and $b$, secured in position by two or more cross members or bars $d$ and $e$. The carriage frame is mounted on suitable axles as shown at $f$ and $g$. The longitudinal channel beam $b$ is bolted to the cross members $d$ and $e$ in such manner as to permit lateral adjustment to any width of gauge by means of screw bolts $h$ and $i$, the cross members $d$ and $e$ being provided with a plurality of bolt-receiving openings, while the longitudinal member $a$ may be bolted in fixed position. The body frame made up of the longitudinal beams $a$ and $b$ together with the cross arms $d$ and $e$ and the wheels $j$ and $l$ (mounted on axle $f$) and wheels $k$ and $m$ (mounted on axle $g$) go to make up the supports for the art working parts or mechanisms. These supports or main portions of the carriage should be of sufficient weight to withstand the momentum and vibrations encountered when the machine is in operation. The wheels may also be adjusted to any gauge on the axles by screws or fixed keys.

The sawing mechanism B is preferably composed of a piston driven from a long stroke air cylinder indicated at $r$, which may be of the well known type employed in pneumatic sand rammers and the like. Secured to the piston $p$ of the pneumatic cylinder is a bracket frame $c$ which is adapted to be reciprocated by the piston $p$, and is made to move in horizontal plane by means of suitable guides as at $o$ which extend through a suitable slot formed in the bracket frame $c$, as indicated at $q$.

The blade saw D is bolted to the forwardly projecting ends of the bracket frame at $s, s$. The saw D and the forwardly presented ends of the bracket are guided or made to slide in horizontal motion by means of guides $t$ and $t$ which are slotted to receive the short bars or members $x, x$ secured to arms of bracket frame $c$ at the point $s, s$. These guides $t, t$ are held in place and connected to the body frame of the machine by spider arms $u, u$ which are secured by jack knife or suitable hinge joints at $v, v$, as shown in Figure 1, in order that the arms $u, u$, with the guides $t, t$, may be swung laterally outward to free the ends of the short bars $x, x$, as described. It will be seen that by moving the spider arms the saw will be released from the guides $t, t$, thereby permitting the saw D and bracket $c$ to be thrown back upon the supporting beam $d$, into a position desirable while the saw is out of action.

The feed mechanism as shown in detail in Figure 3 consists of any usual type of reversible air drill cylinder C provided with a spindle Z which is threaded to mesh with a worm gear $a^2$ so as to give a revolving motion to the axle $g$ which has been referred to as the main driving axle generally indicated by reference character F.

The carriage is shown as a four wheel truck, wherein the main driving axle F is provided with a chain belt $y$ which transmits power to the forward axle $f$ by means of sprocket $c^2$. In addition to the wheels $j, k, l$ and $m$, saw toothed or serrated wheels $d^2$ and $e^2$, mounted on the rear or driving axle are employed and adapted to engage with the wale strips (of which a suitable number are employed to provide a platform or at least a supporting structure beneath the wheels $d^2$ and $e^2$ as well as the wheels $j, k, l$ and $m$) so as to give the necessary friction by engaging with certain strips of the support G to drive the carriage and moves it into place so as to feed the saw blade to the material-to-be-sawed.

My invention is not limited to a direct acting long stroke air cylinder for operating the saw mechanism, since an air motor of the type employed for air drill may be used as shown in Figure 4 where 1 indicates the air motor, 2 the revolving spindle, 3 a bevel gear keyed to the spindle, and meshing with a gear-driving wheel 4. The driving wheel or gear 4 is provided with an eccentric crank pin 5 to which a crank shaft 6 is secured which in turn is connected by a pin or suitable joint to a direct slide rod 7, which in turn is connected at 8 to the saw bracket $c$ and provides the latter with a backward and forward movement. The slide rod 7 moves on a fixed bearing plate 9 in suitable bearing grooves. The machine may be guided by the upwardly curved handles E, E' and the operation of the mechanism may be controlled by the fluid control valves X, X' secured to the ends of the handles. The hand valve X controls the air supply in a pipe $z$ disposed through handle E and the frame members of the carriage for operating the motor $r$; and the hand valve X' controls direct and reverse action of the air in a pipe $z'$ arranged in handle E', to the cylinder C of the feed mechanism and the amount of air supply through the valve X' will control the speed of said carriage through said feed mechanism.

As shown in Figures 1 and 2, the carriage may be provided with eye bolts 10—11—12 and 13 fastened to the frame members $a$ and $b$ adapted to receive suspending cables indicated at 14 and 15 in Figure 2 whereby the machine may be suspended from a vessel or fastening equipment.

The compressed air for operating the motors may come from a suitable source of supply and is fed to the valves X, X' by means of suitable hose as shown in Figure 1 at 16 and 17; the air exhaust may be at any suitable point from the cylinders.

I claim—

1. In a machine of the character described, a carriage, a bracket pivotally mounted at one end of the carriage so as to swing upwardly onto the carriage, said bracket being adapted to reciprocate transversely of the carriage, a saw-blade carried by said bracket to be reciprocated thereby, guide means for the outer ends of the bracket and the saw, power operated means mounted on the carriage for reciprocating said bracket, power operated means for propelling said carriage, and means whereby the carriage may be guided, said means including handgrips for separately controlling the power-imparting medium for both of said power operated means.

2. In a machine of the character described, a laterally adjustable carriage, a bifurcated bracket reciprocatingly mounted at one end of the carriage, a saw-blade secured intermediate of the bifurcations of the bracket, laterally movable guide means at opposite ends of the bracket, and pneumatically operated means for reciprocating said bracket.

3. In a machine of the character described, a carriage provided with wheel carrying axles, toothed wheels mounted on one of the axles, whereby the carriage is moved forward, power means for driving said axle, a saw-carrying bracket pivotally mounted at one end of the carriage, power means for operating said bracket, and rearwardly and upwardly extending handles secured to the opposite end of the carriage, the handles including hand grips for controlling the power medium of both power means.

4. A machine of the character described, comprising a wheeled carriage provided with a driving axle at one end, a bracket reciprocatingly mounted at the forward end of the carriage, a saw-blade carried by said bracket, pneumatically operated means for reciprocating said bracket, pneumatically operated means for operating the driving axle, guide handles, at the rear end of said carriage, each provided with an air-line leading respectively to the pneumatically operated means, and hand grips at the ends of said handles for controlling the air supply to said air-lines, whereby the pneumatically operated means may be separately controlled.

JOHN P. BALL.